US006615576B2

(12) United States Patent  
Sheoran et al.

(10) Patent No.: US 6,615,576 B2  
(45) Date of Patent: Sep. 9, 2003

(54) TORTUOUS PATH QUIET EXHAUST EDUCTOR SYSTEM (75) Inventors: Yogendra Y. Sheoran, Scottsdale, AZ (US); Daniel V. Brown, Glendale, AZ (US); David H. Edmonds, Tempe, AZ (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 10/054,003

(22) Filed: Jan. 21, 2002

(65) Prior Publication Data

US 2002/0139120 A1 Oct. 3, 2002

Related U.S. Application Data (60) Provisional application No. 60/279,819, filed on Mar. 29, 2001.

(51) Int. Cl.[7] .............................. F02C 7/08; F02G 1/00; F02G 3/00
(52) U.S. Cl. .................... 60/39.5; 60/262; 60/264; 60/269; 181/213; 181/220; 181/222
(58) Field of Search ................. 60/39.5, 262, 264, 60/269; 181/213, 220, 222

(56) References Cited

U.S. PATENT DOCUMENTS

| 2,973,825 | A | | 3/1961 | Bertin |
| 3,174,282 | A | | 3/1965 | Harrison |
| 3,227,240 | A | | 1/1966 | Lee et al. |
| 3,688,865 | A | | 9/1972 | Smith |
| 3,710,890 | A | | 1/1973 | True et al. |
| 4,044,555 | A | | 8/1977 | McLoughlin et al. |
| 4,128,769 | A | | 12/1978 | Bons et al. |
| 4,135,363 | A | * | 1/1979 | Packman ................. 60/262 |
| 4,290,262 | A | | 9/1981 | Wynosky et al. |
| 4,355,507 | A | | 10/1982 | Coffey et al. |
| 4,501,393 | A | * | 2/1985 | Klees et al. ........... 239/265.13 |
| 4,623,035 | A | | 11/1986 | Schad et al. |
| 4,645,032 | A | | 2/1987 | Ross et al. |
| 4,713,933 | A | | 12/1987 | Bandera |
| 4,864,819 | A | | 9/1989 | Steyer |
| 4,876,851 | A | | 10/1989 | Mueller |
| 4,909,346 | A | * | 3/1990 | Torkelson ................. 181/213 |
| 5,056,307 | A | * | 10/1991 | Liang ..................... 60/226.1 |
| 5,162,620 | A | | 11/1992 | Ross et al. |
| 5,265,408 | A | | 11/1993 | Sheoran et al. |
| 5,822,975 | A | * | 10/1998 | Andre Guyonnet et al. ............... 60/226.1 |
| 5,826,424 | A | * | 10/1998 | Klees ....................... 60/262 |
| 5,884,843 | A | | 3/1999 | Lidstone et al. |
| 5,908,159 | A | * | 6/1999 | Rudolph ............... 239/265.17 |
| 6,227,800 | B1 | * | 5/2001 | Spring et al. ............ 415/116 |
| 2002/0073690 | A1 | * | 6/2002 | Tse ......................... 60/204 |

FOREIGN PATENT DOCUMENTS

| EP | 0 743 247 A2 | 11/1996 |
| EP | 0 807 576 A2 | 11/1997 |
| EP | 0 968 918 A2 | 1/2000 |
| EP | 1 010 884 A1 | 6/2000 |
| WO | PCT/US 02/09387 | 7/2002 |

\* cited by examiner

*Primary Examiner*—Charles G. Freay  
*Assistant Examiner*—William H. Rodriguez  
(74) *Attorney, Agent, or Firm*—Robert Desmond, Esq.

(57) ABSTRACT

A tortuous path quiet exhaust eductor system may be mounted to a gas turbine engine, such as commercial aircraft APU. The system includes an oil cooler, eductor primary nozzle, oil cooler air nozzle, and surge air dump nozzle. The primary nozzle, oil cooler air nozzle, and surge air dump nozzle direct exhaust flow to entrain APU compartment cooling air, oil cooling air and surge air in a direction having both radial and axial components with respect to the APU centerline axis. The exhaust flow is directed into an eductor mixing duct angled away from the centerline axis and then is turned to enter an exit duct angled toward the centerline axis so that direct line of sight acoustic paths from the tail pipe exit to the turbine exit are blocked, suppressing core noise. The tail pipe ducts may be acoustically treated, further enhancing noise suppression.

37 Claims, 5 Drawing Sheets

TORTUOUS PATH QUIET EXHAUST EDUCTOR SYSTEM

CROSS-REFERENCE TO RELATED APPLICATIONS

The present application claims the benefit of U.S. Provisional Application No. 60/279,819, filed Mar. 29, 2001.

BACKGROUND OF THE INVENTION

The present invention generally relates to gas turbine engine exhaust noise suppression and, more particularly, to a quiet, low back pressure, exhaust eductor cooling system.

The air transportation industry has produced a widespread demand for low-noise gas turbine engine operations around aircraft. For example, in ground servicing of commercial aircraft, where ground crew fuel and provision the aircraft, load and unload baggage, and remove waste materials from the aircraft, certain noise level limits must not be exceeded in order to help ensure the health and safety of ground crew members. Under these ground service conditions, the propulsion engines of the aircraft are typically shut down, and only a turbine engine known as the auxiliary power unit (APU) remains in use. The APU can be used for in-flight operation as well. Examples of twin engine aircraft designed to use the APU include the Boeing 757, 767, and 777 and Airbus A300, A310, and A320. The APU gas turbine engine is usually located in a compartment in the aircraft tail structure. The APU can be used to generate electricity, furnish mechanical power from a rotating shaft, or provide pressurized air to the aircraft, for example, while the aircraft is being ground serviced. Pressurized air typically is used, for example, to power air cycle environmental control units (ECU), which heat or cool the aircraft passenger and crew cabins.

To maintain the noise level of the APU within acceptable limits, an apparatus is often provided to perform noise suppression. The apparatus may comprise an eductor system to entrain sufficient airflow through the compartment to perform necessary and desirable functions, such as APU cooling, compartment cooling, oil cooling, and providing an interface for the dumping of surge bleed control air. The apparatus may also comprise a noise suppression system to maintain the noise level of the APU within acceptable limits.

It is common for APU's to provide compressed air flow which at times significantly exceeds the needs of the aircraft or the turbine. The excess flow, originating from within a load compressor driven by the turbine engine, is referred to as surge air and can be "dumped" or vented into the ambient air. Venting of this pressurized air can significantly increase engine noise. In fact, this bleed noise can be expected to dominate the engine exhaust noise at high frequencies, i.e., above 2,000 Hz. In order to attenuate this air venting noise, many APU engine installations duct the surge dump air into the inlet of the APU turbine engine muffler in order that the muffler will attenuate the engine and surge air flow noise together sufficiently to meet noise emission standards, but results have been less than satisfactory.

It is desirable for the noise suppression apparatus to be able to perform any or all of the functions outlined above within a number of constraints. One constraint, for example, is that the apparatus operate with a minimum of back pressure to the APU turbine engine because back pressure to the turbine engine reduces the turbine engine efficiency, thereby requiring additional fuel burn for the APU to produce the same work. Another example constraint is that the weight of the noise suppression apparatus be minimized because weight is at a premium in aircraft, where extra weight reduces payload. Still another example constraint is that the noise suppression apparatus must be able to fit within the allocated volume of space inside the aircraft. Still another example constraint is that the apparatus should be appropriately oriented for efficient aircraft usage.

It is well known in the art that to achieve adequate noise suppression of an APU turbine engine, both its core noise and turbine noise must be attenuated. Core noise is a low frequency noise component caused primarily by the combustion process within the engine. Turbine noise is a high frequency noise component caused by the interaction of high velocity gases with the engine's turbine section. The frequency spectrum of core noise is essentially broad band, peaking at relatively low frequency around 200 to 800 Hz where most of the sound energy of core noise is concentrated. Turbine noise, on the other hand, is a significantly higher frequency noise phenomenon, having both broad band and discrete spectral components, peaking at relatively high frequency around 15,000 to 20,000 Hz.

A combination of strategies can be used to simultaneously damp the core and turbine noise components. For example, the flow path of the hot gases from the core, turbine and eductor can be turned through a 90 degree angle to break up any direct acoustic path from the exit of the turbine engine to the exit of the tail pipe or noise suppressor exhaust. Also, acoustic treatment of the noise suppressor walls, including both bulk and reactive schemes, can be used to absorb acoustic energy, all as taught by U.S. Pat. Nos. 3,688,865 and 4,128,769. The noise suppression devices shown in these two patents are not suitable for use in aircraft, however, due to their large size. For example, the device of U.S. Pat. No. 3,688,865 is intended for ground based gas turbine engine test installations, and the device of U.S. Pat. No. 4,128,769 is intended for use in a ground vehicle or stationary ground installation. In addition, the turning of the exhaust flow through a 90 degree angle may present further problems in trying to fit these devices into the limited space available in aircraft, and in orienting the exhaust discharge along the direction of the centerline axis of the aircraft as is often desired.

Furthermore, as noise reduction requirements become more stringent in the future, and as the requirements for lighter, more efficient, smaller and less expensive engines increase, there will be a need for more efficient noise suppression which is adequate for use with different configurations of gas turbine engines, such as those with in-line combustors as well as those with reversed flow combustors.

As can be seen, there is a need for a quiet, low back pressure, exhaust noise suppression system. In particular, there is a need for a quiet, low back pressure, exhaust eductor system adequate to cool the APU compartment, the turbine engine casing and its associated gearbox, and generator oil. Additionally, there is a need for an exhaust eductor system that adequately attenuates the noise associated with flow through a surge bleed valve. Furthermore, there is a need for an exhaust eductor system that has minimal weight, is compact enough and configured for efficient aircraft use, and avoids large pressure losses to the gas turbine engine.

SUMMARY OF THE INVENTION

The present invention provides an APU compartment cooling system that also provides significant exhaust noise suppression. In particular, the present invention provides a quiet, low back pressure, exhaust eductor system which provides gas turbine engine and accessory cooling, compartment air cooling, oil cooling, and surge air noise suppression in addition to suppression of core and turbine noise. Moreover, the present invention provides an exhaust eductor system of minimal weight, compact enough for and configured for aircraft use, and which operates at low back pressure.

In one aspect of the present invention, an exhaust eductor system includes an oil cooler, an eductor primary nozzle downstream of a gas turbine engine, such as an APU in a commercial aircraft, an oil cooler air plenum downstream of the oil cooler for collecting oil cooling air and connected to an oil cooler air nozzle disposed about the eductor primary nozzle. A surge air plenum collects surge air from a surge air duct and is connected to a surge air dump nozzle disposed about the oil cooler air nozzle and directed into the eductor mixing duct.

The primary nozzle, oil cooler air nozzle, and surge air dump nozzle are formed so as to direct an exhaust flow from the gas turbine engine and entrain oil cooling air and surge air along with the exhaust flow in a direction having both radial and axial components with respect to a centerline axis of the gas turbine engine. The exhaust flow is directed into an eductor mixing duct angled away from the centerline axis of the gas turbine engine and then enters an exit duct angled toward the centerline axis of the gas turbine engine so that (1) direct line of sight acoustic paths from the tail pipe exit to the turbine exit are blocked, enhancing engine noise suppression, and (2) the exhaust flow is turned, further enhancing the performance of the acoustically treated duct surfaces. The tail pipe eductor mixing ducts and exit ducts are acoustically treated with bulk or reactive liners on some or all of the duct surfaces.

In another aspect of the present invention, a method may include steps of mounting an APU in an aircraft compartment and drawing cooling air through the compartment, in the process of providing compartment air cooling and gas turbine casing cooling, and further includes the steps of mounting a primary nozzle downstream of a gas turbine engine, collecting oil cooling air in an oil cooler air plenum, connecting an oil cooler air nozzle downstream of the oil cooler air plenum, disposing the oil cooler air nozzle about the primary nozzle, collecting surge air in a surge air plenum, connecting a surge air dump nozzle downstream of the surge air plenum, and mounting the surge air dump nozzle about the oil cooler air nozzle.

Then, the oil cooling air is entrained through the oil cooler air plenum and the oil cooler air nozzle, and the surge air is entrained through the surge air plenum, along with the exhaust flow from the gas turbine engine through the primary nozzle, in a direction having both a radial component and an axial component with respect to a centerline axis of the gas turbine engine. The oil cooling air is drawn across an oil cooler in the process providing cooling for the oil used in generators, and gearboxes. The exhaust flow, including the oil cooling air and surge air, is directed into an eductor mixing duct which is angled away from the centerline axis of the gas turbine engine, and is then turned into an exit duct which is angled toward the centerline axis of the gas turbine engine, in order to acoustically block core noise and reduce the acoustic energy of the exhaust flow.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a quiet, low back pressure, exhaust eductor system. This system includes an eductor system for entraining air flow through the compartment to provide all necessary cooling including oil cooling as well as surge air flow dumping and a system for providing significant noise suppression. Because it provides these functions at minimal weight and within stringent space limitations, the gas turbine engine exhaust eductor system of the present invention is suitable for use on aircraft, and particularly on an auxiliary power unit (APU), which is typically mounted in the tail structure or tail cone of a commercial aircraft.

Because the system provides superior noise suppression over the prior art without increasing back pressure load on the APU, it can be used with gas turbine engines having in-line flow combustors, which have some advantages over gas turbine engines with reversed flow combustors, for example, the in-line flow combustor is cheaper and provides better system performance for certain configurations of the upstream compressor. Gas turbine engines having in-line flow combustors are inherently noisier, however, so require a more effective noise suppression system. Also, if significantly lower installed noise levels are required for engines with quieter reversed flow annular combustors, the system described here can provide those.

The noise suppression system of the present invention achieves substantial improvement over the prior art in noise suppression relative to the amount of back pressure imposed on the gas turbine engine by arranging the sequence and orientation of elements and features in a unique and novel way, and also by the addition of novel features and elements not found in the prior art. For example, in one embodiment, the exhaust eductor system incorporates a combination of elements including exhaust eductors to entrain cooling air, for APU cooling, compartment cooling, and oil-cooling, with acoustic wall treatment, and turning of the exhaust flow path to provide line of sight blockage of any direct acoustic path between the turbine exit and the tail pipe exit of the noise suppression system, also referred to as "acoustic blocking". These features and elements are arranged in a novel way to produce an outwardly in-line device, which can be installed in a conventional aircraft auxiliary power unit installation, unlike prior art devices that turn the exhaust flow through 90 a degree angle, which are not suitable for most aircraft installations. Furthermore, the device maintains low pressure drops to the overall exhaust system, which allows for minimization of the engine size and for better fuel economy.

The noise suppression system of the present invention includes novel features and elements not found in the prior art. Prior art eductors, for example, typically entrain air in an axial direction. By way of contrast, in one embodiment the eductor entrains air in a direction which has a radial component as well as an axial component. Unlike the prior art, one embodiment uses the radial component of the air entrained by the eductor to turn the exhaust flow. The exhaust flow path is turned through an angle less than 90 degrees away from the turbine centerline and then turned back again toward the turbine centerline in order to achieve acoustic blocking, also in contrast to the prior art. In another embodiment, the exhaust flow path is split and rejoined to achieve an outwardly in-line device suitable for aircraft installation. In one embodiment, oil cooling air, surge dump air, and turbine engine exhaust all enter the eductor along a single plane. Sufficient ambient air is educted to perform APU cooling, compartment cooling, and turbine engine and accessory oil cooling, unlike typical prior art, which cannot educt sufficient ambient air and provide significant noise suppression with low pressure losses.

Figure 1:
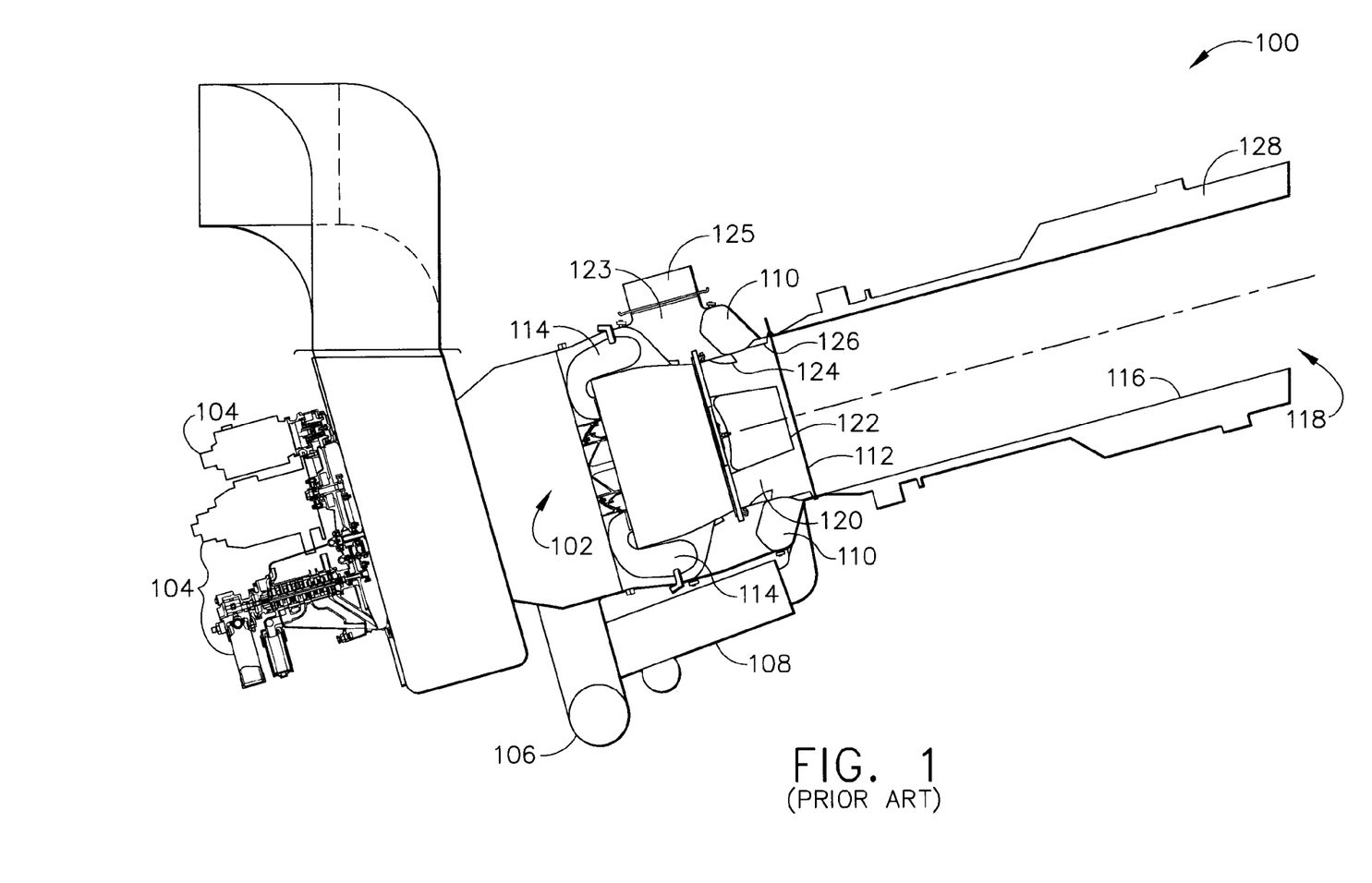
FIG. 1 is a cross section diagram of a side view of an eductor muffler system on a conventional APU having a reversed flow combustor with exhaust flow directed into a conventional line-of-sight treated tailpipe.

Referring now to FIG. 1, eductor muffler system 100 as previously manufactured is shown on a conventional APU having a reversed flow combustor.

An in-line or straight exhaust flow path muffler with acoustically treated walls similar to the muffler shown in FIG. 1 is disclosed in U.S. Pat. No. 5,162,620, entitled "Dual Flow Turbine Engine Muffler", issued Nov. 10, 1992, and assigned to the assignee of the present invention. The disclosure in that patent is hereby fully incorporated by reference into the present application. The muffler disclosed in U.S. Pat. No. 5,162,620 has a perforated section at the upstream end that allows surge bleed flow to enter the main flow stream from an annular section, but does not disclose an eductor nor acoustic blocking. An exhaust eductor for entraining oil cooling air and surge air into a gas turbine engine exhaust is disclosed in U.S. Pat. No. 5,265,408, entitled "Exhaust Eductor Cooling System", issued Nov. 30, 1993, and assigned to the assignee of the present invention. The disclosure in that patent is hereby fully incorporated by reference into the present application. The exhaust eductor disclosed in U.S. Pat. No. 5,265,408 does not disclose using the eductor to turn or separate the exhaust flow nor acoustic blocking. Further examples of acoustic treatment are disclosed in U.S. Pat. No. 4,645,032, entitled "Compact Muffler Apparatus And Associated Methods", issued Feb. 24, 1987, and assigned to the assignee of the present invention. The disclosure in that patent is hereby incorporated by reference into the present application.

As seen in FIG. 1, eductor muffler system 100 is attached to gas turbine engine APU 102. APU 102 is used to drive a number of devices 104 which may include a gearbox, a load compressor, and a generator, for example. APU 102 may be used to drive a load compressor to provide pressurized air that flows, for certain APU operating conditions, through bleed air duct 106. Bleed air duct 106 is typically connected to a duct, such as surge air duct 108, for purposes of dumping excess air, referred to as "surge air". FIG. 1 shows an example where surge air duct 108 communicates with surge air plenum 110, which is annular and is disposed near gas turbine exit 112 and surrounds primary nozzle center body 122. Surge air plenum 110 may also be referred to as a "surge duct annulus". The gas turbine engine of APU 102 uses a reversed flow annular combustor 114. As seen in FIG. 1, reversed flow annular combustor 114 includes an approximately 180 degree turn from the interior of the combustor to its exit, so that combustor 114 appears "folded" in FIG. 1. Such a folded shape for combustor 114 has the advantage of interrupting or blocking direct "line of sight" paths from the interior of combustor 114 to gas turbine exit 112, i.e., combustor 114 achieves some acoustic blocking which helps to attenuate core noise from APU 102. Tail pipe 116 of eductor muffler system 100 is essentially straight, providing direct line of sight paths from gas turbine exit 112 to tail pipe exit 118, and therefore, very little core noise attenuation from gas turbine exit 112 to tail pipe exit 118.

Disposed near gas turbine exit 112 is primary nozzle 120 which includes primary nozzle center body 122 for directing the hot turbine exhaust gases axially into tail pipe 116. Primary nozzle 120 may include mixing lobes. Also disposed near gas turbine exit 112 is oil cooler air plenum 123 and oil cooler air nozzle 124. Oil cooler air nozzle 124 communicates with oil cooler 125 through oil cooler air plenum 123. Oil cooler nozzle 124 may include mixing lobes. In operation, oil cooling air is drawn across oil cooler 125, into and through oil cooler air plenum 123, through oil cooler air nozzle 124 and entrained axially along with the hot turbine exhaust gases from primary nozzle 120 into tail pipe 116.

Surge air plenum 110, which is annular and disposed near gas turbine exit 112 as described above, communicates with surge air dump nozzle 126, which is situated downstream of oil cooler air nozzle 124, as seen in FIG. 1. In operation, surge air flows from bleed air duct 106 through surge air duct 108, into surge air plenum 110, through surge air dump nozzle 126, and is entrained axially along with the hot turbine exhaust gases from primary nozzle 120 into tail pipe 116. Tail pipe 116 includes acoustic treatment 128, which may include, for example, annular cavities wrapped around the tail pipe including annular baffles spaced apart to form resonant chambers. Acoustic treatment 128 may also include sound absorbent materials. Further examples of acoustic treatment are disclosed in U.S. Pat. Nos. 5,162,620 and 4,645,032, referenced above.

Thus, FIG. 1 shows an oil cooling eductor system with acoustic treatment for the tail pipe, which handles surge flow by educting it into the tail pipe.

Figure 2:
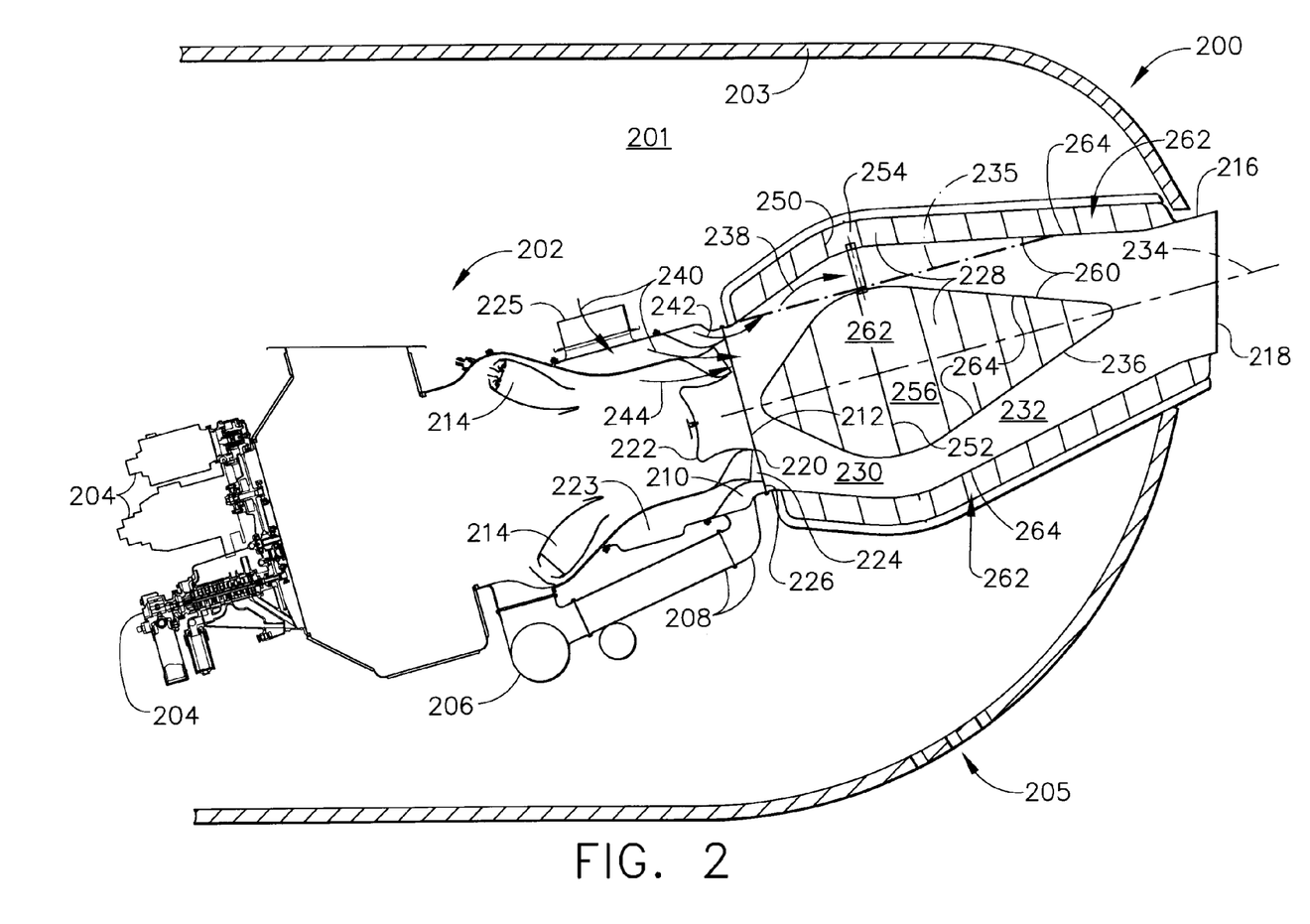
FIG. 2 is a cross section diagram of a side view of an APU in an aircraft compartment with a quiet, low back pressure, exhaust eductor system, according to an embodiment of the present invention, on an APU having an in-line flow combustor.

FIG. 2 shows exhaust eductor system 200, according to one embodiment, on an APU 202 having in-line flow annular combustor 214. APU 202 may be mounted and housed in an aircraft compartment 201 defined by compartment wall 203. Compartment inlet 205 may be provided, as known in the art, for providing cooling air flow through compartment 201 and into oil cooler 225 for purposes of cooling compartment 201 and cooling APU 202 external casing as well as providing oil cooling air and accessory cooling air.

FIG. 2 includes several features and elements which are numbered similarly to similar features and elements of FIG. 1 to which they correspond. Thus, FIG. 2 shows exhaust eductor system 200 is attached to gas turbine engine APU 202. APU 202 is used to drive a number of devices 204 which may include a gearbox, a load compressor, and a generator, for example. APU 202 may be used to drive a load compressor to provide pressurized air that, for certain APU operating conditions, flows through bleed air duct 206. Bleed air duct 206 is typically connected to a duct, such as surge air duct 208, for purposes of dumping excess or surge air. FIG. 2 shows an example where surge air duct 208 communicates with surge air plenum 210, which is annular and disposed near gas turbine exit 212. The gas turbine engine of APU 202 uses an in-line flow annular combustor 214. As seen in FIG. 2, in-line flow annular combustor 214 exits substantially directly into the turbine of APU 202.

Such an in-line configuration for combustor 214 does little to interrupt or block direct "line of sight" paths from the interior of combustor 214 to gas turbine exit 212, so that the gas turbine engine of APU 202 tends to be noisier than the gas turbine engine of APU 102, despite its other significant advantages. In order to help attenuate core noise from the gas turbine engine of APU 202, tail pipe 216 of exhaust eductor system 200 may be provided with two ducts, eductor mixing duct 230 and exit duct 232, angled with respect to centerline axis 234 of the gas turbine engine of APU 202 so as to block any direct line of sight path, such as line of sight 235, between gas turbine exit 212 and tail pipe exit 218. Thus, tail pipe 216 of exhaust eductor system 200 may provide acoustic blocking of the core noise from combustor 214.

In one embodiment, as shown in FIG. 2, eductor mixing duct 230 and exit duct 232 have been provided as annular ducts surrounding axisymmetric center body 236. As seen in FIG. 2 eductor mixing duct 230 may be tapered so that the cross sectional area of eductor mixing duct 230 remains constant along the axial length of eductor mixing duct 230. Similarly, exit duct 232 may be tapered so that the cross sectional area of the flow path is constant in both eductor mixing duct 230 and exit duct 232. Eductor mixing duct 230 may be angled away from centerline axis 234 at an angle between 0 and 90 degrees, and exit duct 232 may be angled toward centerline axis 234 at an angle between 0 and 90 degrees. Exhaust mixed flow 238, which may include entrained oil cooling air 240 and surge air 242 as well as gas turbine exhaust 244, is turned upon exiting eductor mixing duct 230 into exit duct 232, forcing all acoustic waves to propagate into acoustically treated surfaces before exiting the duct, thereby providing increased exhaust noise attenuation.

Disposed near gas turbine exit 212 is primary nozzle 220 which is disposed about primary nozzle center body 222 for directing hot gases of turbine exhaust 244 both axially and radially into eductor mixing duct 230. In other words, turbine exhaust 244 may be directed in a direction which has both axial and radial components with respect to centerline axis 234. Primary nozzle 220 may include mixing lobes 246, which are more clearly shown in FIG. 3A and FIG. 3B. Also disposed near gas turbine exit 212 is oil cooler air plenum 223 and oil cooler air nozzle 224. Oil cooler air nozzle 224 communicates with oil cooler 225 through oil cooler air plenum 223. Oil cooler air nozzle 224 may include mixing lobes 248, which are more clearly shown in FIG. 3A.

In operation, oil cooling air 240 is drawn across oil cooler 225, into and through oil cooler air plenum 223, through oil cooler air nozzle 224 and entrained axially and radially along with the hot gases of turbine exhaust 244 from primary nozzle 220 into eductor mixing duct 230.

Surge air plenum 210, which may be annular and disposed near gas turbine exit 212, communicates with surge air dump nozzle 226, which also may be disposed near turbine exit 212 radially outwardly of oil cooler air nozzle 224, as seen in FIG. 2. In operation, surge air 242 may flow from bleed air duct 206 through surge air duct 208, into surge air plenum 210, through surge air dump nozzle 226, and may be mixed axially and radially along with the hot gases of turbine exhaust 244 from primary nozzle 220 into eductor mixing duct 230. Eductor mixing duct 230 includes acoustic treatment 228, which may include, for example, annular cavities wrapped around eductor mixing duct 230 and exit duct 232 or included in center body 236. Acoustic treatment 228 may include annular baffles 250, or axisymmetric baffles 252 in center body 236, spaced apart to form resonant chambers 254 and 256. The duct liner, the surface contacted by the exhaust flow, may be constructed of perforated metal of relatively small percent open area or fibrous metal, both of which form a thin viscous layer for acoustic absorption to provide a thin acoustic liner 260. Surfaces on which flow directly impinges, the "outsides" of each turn, may be constructed of a stronger solid metal to provide the required strength—perforated and fibrous metal liners are not generally as strong as solid sheet metal and may quickly degrade if subjected to high momentum exhaust flow.

Acoustic treatment 228 may also include relatively thick bulk sound absorbent materials 262 that fill the entire backing space 264 of the resonant muffler design. For such a bulk liner configuration the duct wall, or facesheet, may be constructed of relatively open perforate plate that serves to protect the bulk sound absorbent material 262 from erosion by the grazing flow. If the APU exhaust flow velocities are relatively high, it may be necessary to use special bulk sound absorbent materials 262 that are resistant to degradation by flow, such as those with protective, yet acoustically transparent, covers and those constructed of single strands of material woven together into a mesh. Further examples of acoustic treatment are disclosed in U.S. Pat. No. 4,645,032, referenced above.

Thus, FIG. 2 shows exhaust eductor system 200, according to one embodiment, which includes an oil cooling eductor system with superior noise suppression acoustic properties, and which handles surge flow by educting it into the tail pipe.

Figure 3A:
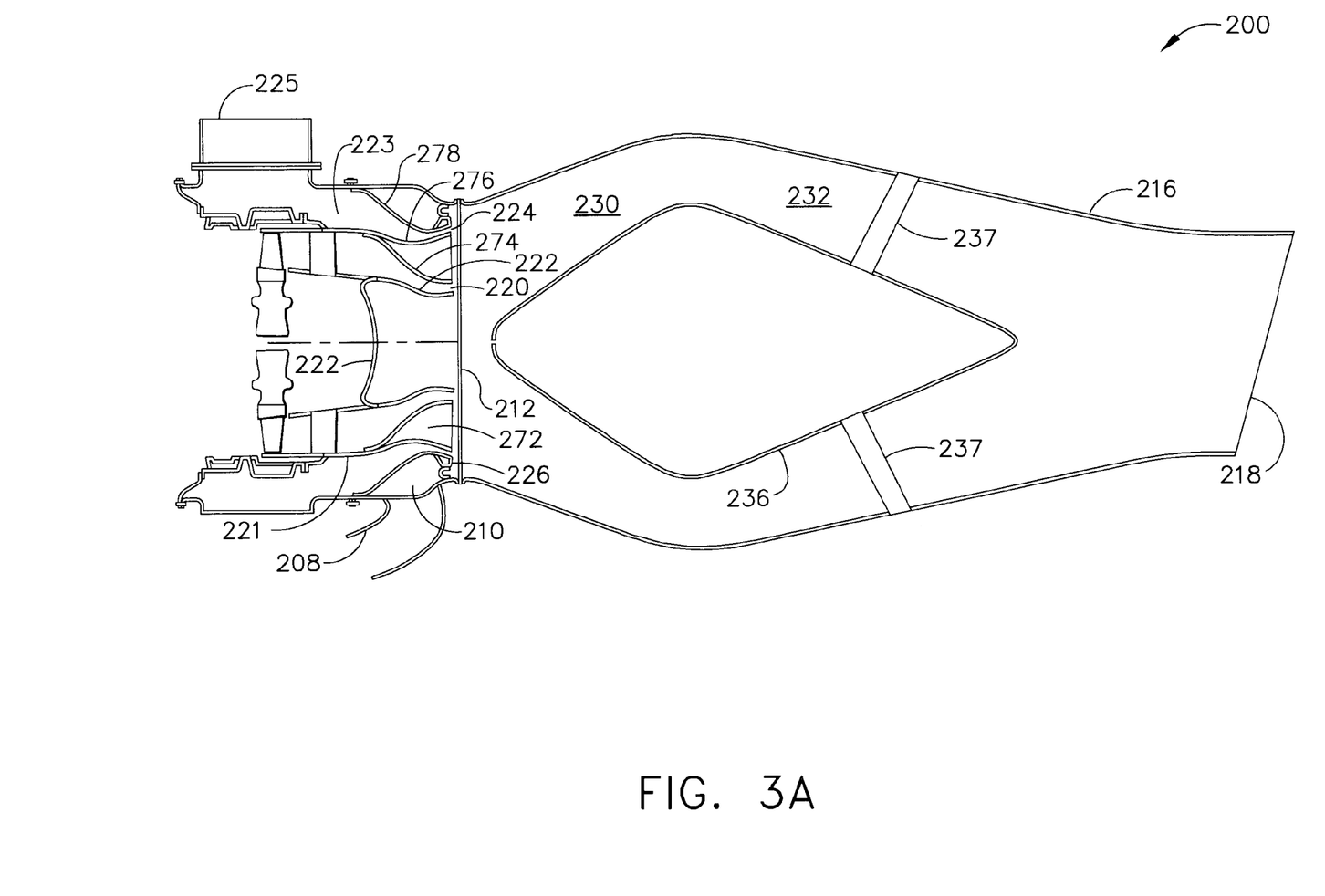
FIG. 3A is a cross section diagram, emphasizing certain details, of a side view of the exhaust eductor system shown in FIG. 2, according to an embodiment of the present invention.

FIG. 3A shows exhaust eductor system 200, according to one embodiment with certain details enlarged for greater clarity. FIG. 3A shows surge air duct 208, surge air plenum 210, gas turbine exit 212, tail pipe 216, tail pipe exit 218, primary nozzle 220, primary nozzle center body 222, oil cooler air plenum 223, oil cooler air nozzle 224, oil cooler 225, surge air dump nozzle 226, eductor mixing duct 230, exit duct 232, and center body 236, all as described above and shown in FIG. 2. FIG. 3A also shows center body pylons 237, as an example of one means of mounting center body 236 and holding center body 236 in place within annular eductor mixing duct 230 and annular exit duct 232, thus forming the interior walls of annular eductor mixing duct 230 and annular exit duct 232 and furnishing the necessary taper to provide constant cross sectional flow area in eductor mixing duct 230 and exit duct 232.

Figure 3B:
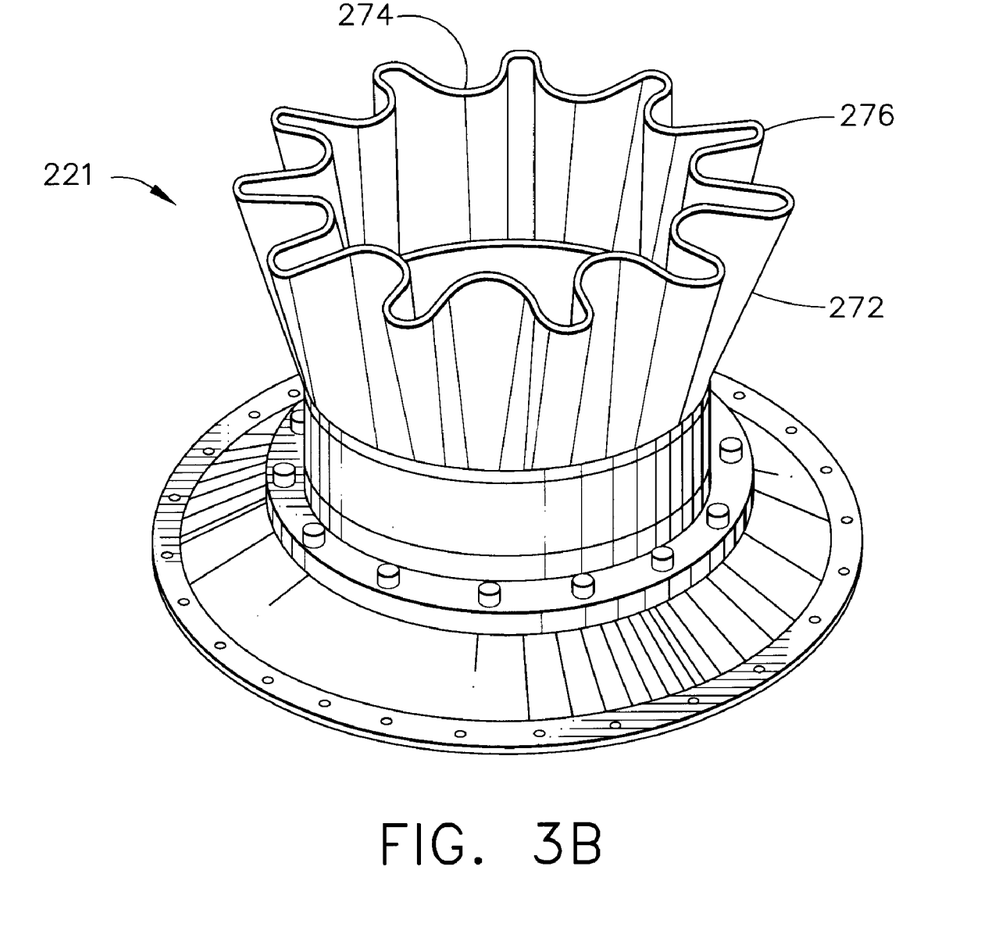
FIG. 3B is an isometric view of the primary nozzle portion of the exhaust eductor system shown in FIG. 3A, according to an embodiment of the present invention.

FIG. 3A and FIG. 3B more clearly show that mixer nozzle 221 may delineate the boundary between primary nozzle 220 and oil cooler nozzle 224. As more clearly seen in FIG. 3B, mixer nozzle 221 may include lobed mixer 272 having symmetrical inner and outer lobes 274 and 276 circumferentially disposed about lobed mixer 272. Inner and outer lobes 274 and 276 of lobed mixer 272 are radially spaced from primary nozzle center body 222. Thus, the flow path of primary nozzle 220 may be bounded or formed by primary nozzle center body 222 and the inner surface of lobed mixer 272. FIG. 3A shows flow path of primary nozzle 220 between primary nozzle center body 222 and inner lobe 274. Inner and outer lobes 274 and 276 of lobed mixer 272 are radially spaced inward from nozzle wall 278 of oil cooler air nozzle 224. Thus, the flow path of oil cooler air nozzle 224 may be bounded or formed by the outer surface of lobed mixer 272 and nozzle wall 278. FIG. 3A shows flow path of oil cooler air nozzle 224 between outer lobe 276 and nozzle wall 278. The flow path of oil cooler air nozzle 224 may be adapted for receiving oil cooler air. Such a lobed mixer design may improve the eductor action and mixing of turbine exhaust 244 and oil cooling air 240, as seen in FIG. 2. A mixer nozzle may also be provided without lobes, or may be provided with tabs or chevrons, as known in the art.

Figure 4A:
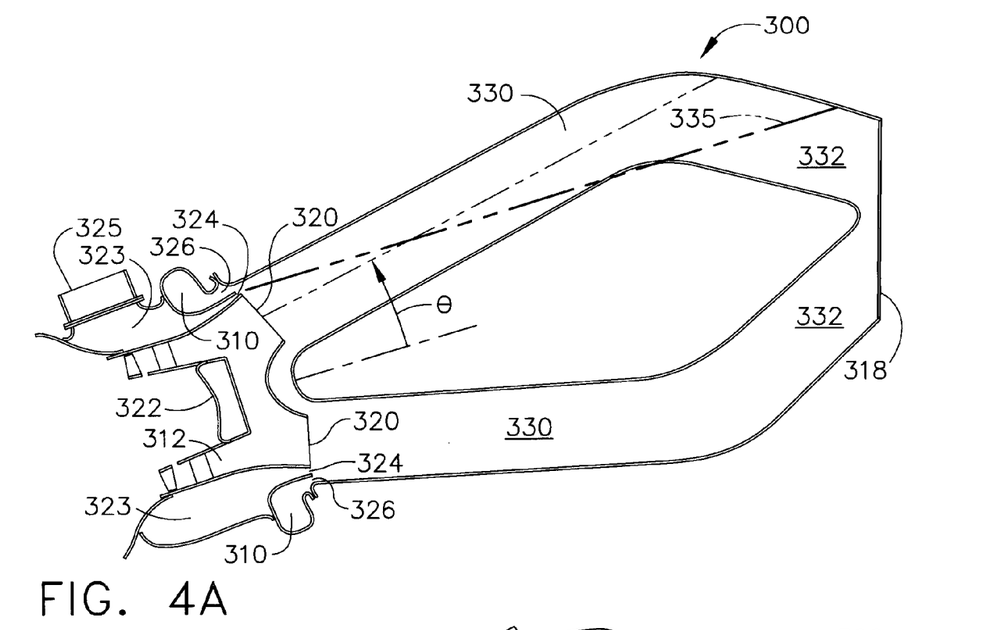
FIG. 4A is a cross section diagram of a side view of a quiet, low back pressure, exhaust eductor system, according to another embodiment of the present invention.
Figure 4B:
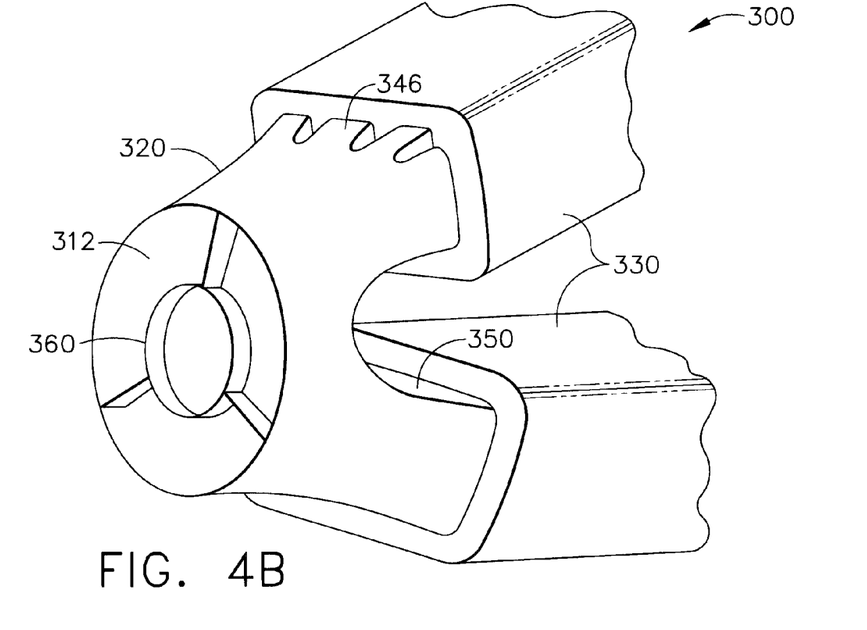
FIG. 4B is an isometric view of a portion of the exhaust eductor system shown in FIG. 4A, according to an embodiment of the present invention.

FIGS. 4A and 4B show exhaust eductor system 300, in accordance with another embodiment and in particular FIG. 4A shows a side view diagram of exhaust eductor system 300, and FIG. 4B shows an isometric view of a portion of exhaust eductor system 300.

FIGS. 4A and 4B include several features and elements which are numbered similarly to similar features and elements of FIGS. 2 and 3 to which they correspond. Thus, FIGS. 4A and 4B show exhaust eductor system 300 including turbine exit 312, tail pipe exit 318, primary nozzle center body 322, and oil cooler 325, as described above and shown in FIGS. 2 and 3.

Note that the embodiment shown in FIGS. 4A and 4B does not include a center body. Instead, eductor mixing ducts 330 are formed as two separate ducts and exit ducts 332 are formed as two separate ducts which may join to form single tail pipe exit 318. Each of eductor mixing ducts 330 can have constant cross sectional flow area, and likewise each of exit ducts 332 can have constant cross sectional flow area. In this embodiment, primary nozzle 320 may be Y-shaped as seen in each of FIGS. 4A and 4B. In other words, the turbine exhaust at turbine exit 312 may be split into two separate flows, and each flow may be directed with an axial and a radial component, as indicated by angle θ shown in FIG. 4A, into eductor mixing ducts 330, which may be angled at an angle between 0 and 90 degrees. The flows are then turned into exit ducts 332, which may be angled at an angle between 0 and 90 degrees. The flows may then be rejoined before exiting tail pipe exit 318. As seen in FIG. 4A, any direct line of sight path between turbine exit 312 or nozzles 320, 324, or 326, and tail pipe exit 318, such as line of sight 335, is blocked, thereby providing acoustic blocking and improving core noise suppression. Acoustic treatment schemes similar to those described above may be used on the embodiment shown in FIGS. 4A and 4B, taking advantage of the forced propagation of all acoustic waves into the acoustic treatment in addition to line-of-sight blockage. The aspect ratio, which is the ratio of duct width to duct height, of acoustically treated ducts 330 and 332 may be increased to further improve noise attenuation.

FIG. 4A also shows that oil cooler air plenum 323, and surge air plenum 310 are disposed about turbine exit 312. Oil cooler air plenum 323 communicates with oil cooler air nozzle 324 disposed about primary nozzle 320, and functions to entrain oil cooling air into the exhaust flow as previously described in connection with FIGS. 2 and 3. Surge air plenum 310 communicates with surge air dump nozzle 326 disposed about primary nozzle 320, and functions to entrain surge air into the exhaust flow as previously described in connection with FIGS. 2 and 3.

As seen in FIG. 4B, primary nozzle 320 may also include mixing lobes 346 or non lobed nozzle walls 350. Primary nozzle may include mounting bracket 360 for securing primary nozzle 320 to turbine primary nozzle center body 322.

Thus, FIGS. 4A and 4B show exhaust eductor system 300, according to an alternative embodiment, which may include an oil cooling eductor system with superior noise suppression acoustic properties, and which handles surge flow by educting it into the tail pipe.

It should be understood, of course, that the foregoing relates to preferred embodiments of the invention and that modifications may be made without departing from the spirit and scope of the invention as set forth in the following claims.

We claim:

1. An exhaust eductor system comprising:
a primary nozzle downstream of a gas turbine engine;
an oil cooler air plenum in air communication with an oil cooler and downstream of said oil cooler;
an oil cooler air nozzle downstream of said oil cooler air plenum and disposed about said primary nozzle, wherein said primary nozzle and said oil cooler air nozzle are formed so as to direct an exhaust flow from said gas turbine engine and entrain oil cooling air along with said exhaust flow in a direction having both radial and axial components with respect to a centerline axis of said gas turbine engine;
an eductor mixing duct angled away from said centerline axis of said gas turbine engine; and
an exit duct angled toward said centerline axis of said gas turbine engine.

2. The system of claim 1, further comprising a compartment inlet configured to allow cooling air to be drawn through a compartment, said compartment housing an APU.

3. The system of claim 2 wherein said compartment inlet is further configured to allow drawing of said cooling air into said oil cooler.

4. The system of claim 1, further comprising:
a surge air plenum in air communication with a surge air duct; and
a surge air dump nozzle disposed about said oil cooler air nozzle and downstream of said surge air plenum, whereby surge air is mixed along with said exhaust flow in a direction having both radial and axial components with respect to said centerline axis of said gas turbine engine.

5. The system of claim 1, wherein said primary nozzle includes mixing lobes.

6. The system of claim 1, wherein said oil cooler air nozzle includes mixing lobes.

7. The system of claim 1, wherein said eductor mixing duct includes an acoustic treatment.

8. The system of claim 1, wherein said exit duct includes an acoustic treatment.

9. The system of claim 7, wherein said acoustic treatment includes a thin acoustic liner backed by resonant chambers.

10. The system of claim 8, wherein said acoustic treatment includes a thin acoustic liner backed by resonant chambers.

11. The system of claim 7, wherein said acoustic treatment includes sound absorbent materials.

12. The system of claim 8, wherein said acoustic treatment includes sound absorbent materials.

13. The system of claim 1, further comprising an axially symmetric center body wherein said eductor mixing duct and said exit duct are annular and surround said center body.

14. The system of claim 13, wherein said annular eductor mixing duct is tapered to provide constant cross sectional flow area.

15. The system of claim 13, wherein said center body includes acoustic treatment.

16. The system of claim 13, wherein said center body includes acoustic treatment using a thin acoustic liner backed by resonant chambers in said center body.

17. The system of claim 13, wherein said center body includes acoustic treatment using sound absorbent materials filling said center body.

18. The system of claim 1 wherein said primary nozzle is Y shaped, said system having at least 2 eductor mixing ducts and at least 2 exit ducts wherein said exit ducts join to provide a single tail pipe exit of said exhaust eductor system.

19. The system of claim 1 having at most one eductor mixing duct and at most one exit duct, wherein said eductor mixing duct is non-annular and said exit duct is non-annular, said primary nozzle formed so as to direct said exhaust flow into said eductor mixing duct and said eductor mixing duct formed so as to direct said exhaust flow into said exit duct.

20. The system of claim 19 further comprising an acoustic treatment including a thin acoustic liner backed by resonant chambers.

21. The system of claim 19 further comprising an acoustic treatment including sound absorbent materials in a backing space.

22. The system of claim 1, wherein said eductor mixing ducts have constant cross sectional flow area.

23. An exhaust eductor system comprising:
a compartment inlet configured to allow cooling air to be drawn through a compartment, said compartment housing a gas turbine engine;
an oil cooler;
a primary nozzle downstream of said gas turbine engine;
an oil cooler air plenum in air communication with said oil cooler and downstream of said oil cooler;
an oil cooler air nozzle downstream of said oil cooler air plenum and disposed about said primary nozzle;
a surge air plenum in air communication with a surge air duct;
a surge air dump nozzle disposed about said oil cooler air nozzle and downstream of said surge air plenum, wherein said primary nozzle, said oil cooler air nozzle, and said surge air dump nozzle are formed so as to direct an exhaust flow from said gas turbine engine and entrain said cooling air and surge air along with said exhaust flow in a direction having both radial and axial components with respect to a centerline axis of said gas turbine engine;
an eductor mixing duct angled away from said centerline axis of said gas turbine engine; and
an exit duct angled toward said centerline axis of said gas turbine engine.

24. A method comprising steps of:
mounting a primary nozzle downstream of a gas turbine engine;
collecting oil cooling air in an oil cooler air plenum;
mounting an oil cooler air nozzle about said primary nozzle and downstream of said oil cooler air plenum;
entraining said oil cooling air through said oil cooler air plenum and said oil cooler air nozzle along with an exhaust flow from said gas turbine engine through said primary nozzle, wherein said oil cooling air is entrained in a direction having a radial component and an axial component with respect to a centerline axis of said gas turbine engine;
drawing said oil cooling air across an oil cooler;
directing said exhaust flow and said oil cooling air into an eductor mixing duct wherein said eductor mixing duct is angled away from said centerline axis of said gas turbine engine; and
turning said exhaust flow and said oil cooling air into an exit duct wherein said exit duct is angled toward said centerline axis of said gas turbine engine.

25. The method of claim 24 further comprising steps of:
drawing cooling air through a compartment inlet, into and through a compartment, said compartment housing an APU;
entraining said cooling air along with an exhaust flow from said gas turbine engine through said primary nozzle.

26. The method of claim 24 further comprising steps of:
mounting an APU in a compartment;
drawing said oil cooling air through said compartment before said step of collecting said oil cooling air.

27. The method of claim 24 further comprising steps of:
collecting surge air in a surge air plenum;
mounting a surge air dump nozzle about said oil cooler air nozzle and downstream of said surge air plenum;
entraining said surge air through said surge air plenum along with said exhaust flow from said gas turbine engine through said primary nozzle, wherein said surge air is entrained in a direction having both a radial component and an axial component with respect to a centerline axis of said gas turbine engine;
directing said exhaust flow and said surge air into said eductor mixing duct wherein said eductor mixing duct is angled away from said centerline axis of said gas turbine engine; and
turning said exhaust flow and said surge air into said exit duct wherein said exit duct is angled toward said centerline axis of said gas turbine engine.

28. The method of claim 24 wherein said eductor mixing duct is angled away from said centerline axis of said gas turbine engine at an angle that is greater than 0 degrees and less than 90 degrees.

29. The method of claim 24 wherein said exit duct is angled toward said centerline axis of said gas turbine engine at an angle that is greater than 0 degrees and less than 90 degrees.

30. The method of claim 24 further comprising a step of absorbing acoustic energy from said exhaust flow and said oil cooling air through a wall of said eductor mixing duct.

31. The method of claim 24 further comprising a step of absorbing acoustic energy from said exhaust flow and said oil cooling air through a wall of said exit duct.

32. The method of claim 30 wherein said step of absorbing acoustic energy is performed using a thin acoustic liner backed by resonant chambers.

33. The method of claim 31 wherein said step of absorbing acoustic energy is performed using a thin acoustic liner backed by resonant chambers.

34. The method of claim 30 wherein said step of absorbing acoustic energy is performed using sound absorbent materials in a backing space.

35. The method of claim 31 wherein said step of absorbing acoustic energy is performed using sound absorbent materials in a backing space.

36. The method of claim 24 wherein said oil cooler cools oil from said gas turbine engine.

37. The method of claim 24 wherein said oil cooler cools oil from an accessory driven by said gas turbine engine.

* * * * *